United States Patent
Takatsukasa

(10) Patent No.: US 11,477,024 B2
(45) Date of Patent: Oct. 18, 2022

(54) INFORMATION PROCESSING APPARATUS AND INFORMATION PROCESSING METHOD

(71) Applicant: FUJI ELECTRIC CO., LTD., Kanagawa (JP)

(72) Inventor: Kenji Takatsukasa, Tokyo (JP)

(73) Assignee: FUJI ELECTRIC CO., LTD., Kawasaki (JP)

(*) Notice: Subject to any disclaimer, the term of this patent is extended or adjusted under 35 U.S.C. 154(b) by 233 days.

(21) Appl. No.: 16/941,945

(22) Filed: Jul. 29, 2020

(65) Prior Publication Data

US 2021/0091947 A1    Mar. 25, 2021

(30) Foreign Application Priority Data

Sep. 20, 2019 (JP) .............................. JP2019-171450

(51) Int. Cl.
*H04L 9/30* (2006.01)
*H04L 29/06* (2006.01)
*H04L 9/40* (2022.01)

(52) U.S. Cl.
CPC ............ *H04L 9/30* (2013.01); *H04L 63/0435* (2013.01)

(58) Field of Classification Search
CPC ............................ H04L 9/30; H04L 63/0435
See application file for complete search history.

(56) References Cited

U.S. PATENT DOCUMENTS

| | | | |
|---|---|---|---|
| 3,928,845 A * | 12/1975 | Clark | G09G 5/26 345/472 |
| 10,097,343 B2 | 10/2018 | Takatsukasa | |
| 10,148,427 B2 | 12/2018 | Takatsukasa | |
| 10,581,594 B2 * | 3/2020 | Wolrich | G06F 9/30101 |
| 10,623,175 B2 * | 4/2020 | Gueron | G06F 9/3001 |
| 11,075,746 B2 * | 7/2021 | Gueron | G06F 9/3016 |
| 11,113,676 B2 * | 9/2021 | Hanke | H04L 9/0643 |
| 11,128,443 B2 * | 9/2021 | Gueron | G06F 9/30007 |
| 11,269,993 B2 * | 3/2022 | Isobe | H04L 9/0618 |
| 11,301,481 B2 * | 4/2022 | Kheterpal | G06F 16/951 |
| 2014/0093069 A1 * | 4/2014 | Wolrich | H04L 9/0643 380/28 |
| 2017/0272238 A1 * | 9/2017 | Takatsukasa | G09C 1/00 |
| 2017/0353299 A1 * | 12/2017 | Takatsukasa | G06F 21/85 |
| 2019/0188703 A1 * | 6/2019 | Murray | H04L 9/002 |
| 2020/0044822 A1 * | 2/2020 | Kotha | H04L 9/0631 |

FOREIGN PATENT DOCUMENTS

| | | |
|---|---|---|
| JP | 2014-137415 | 7/2014 |
| JP | 2017-044757 | 3/2017 |
| JP | 2017-167390 | 9/2017 |
| JP | 2017-216619 | 12/2017 |

\* cited by examiner

*Primary Examiner* — Yonas A Bayou
(74) *Attorney, Agent, or Firm* — IPUSA, PLLC

(57) ABSTRACT

An information processing apparatus includes a memory, and a processor coupled to the memory and configured to generate, from a common key used for symmetric key cryptography, and from either an encryption process using the common key or a decryption process using the common key, an encryption lookup table corresponding to the encryption process or a decryption lookup table corresponding to the decryption process by using white box cryptography, and disseminate the generated encryption lookup table or the generated decryption lookup table as a public key.

6 Claims, 10 Drawing Sheets

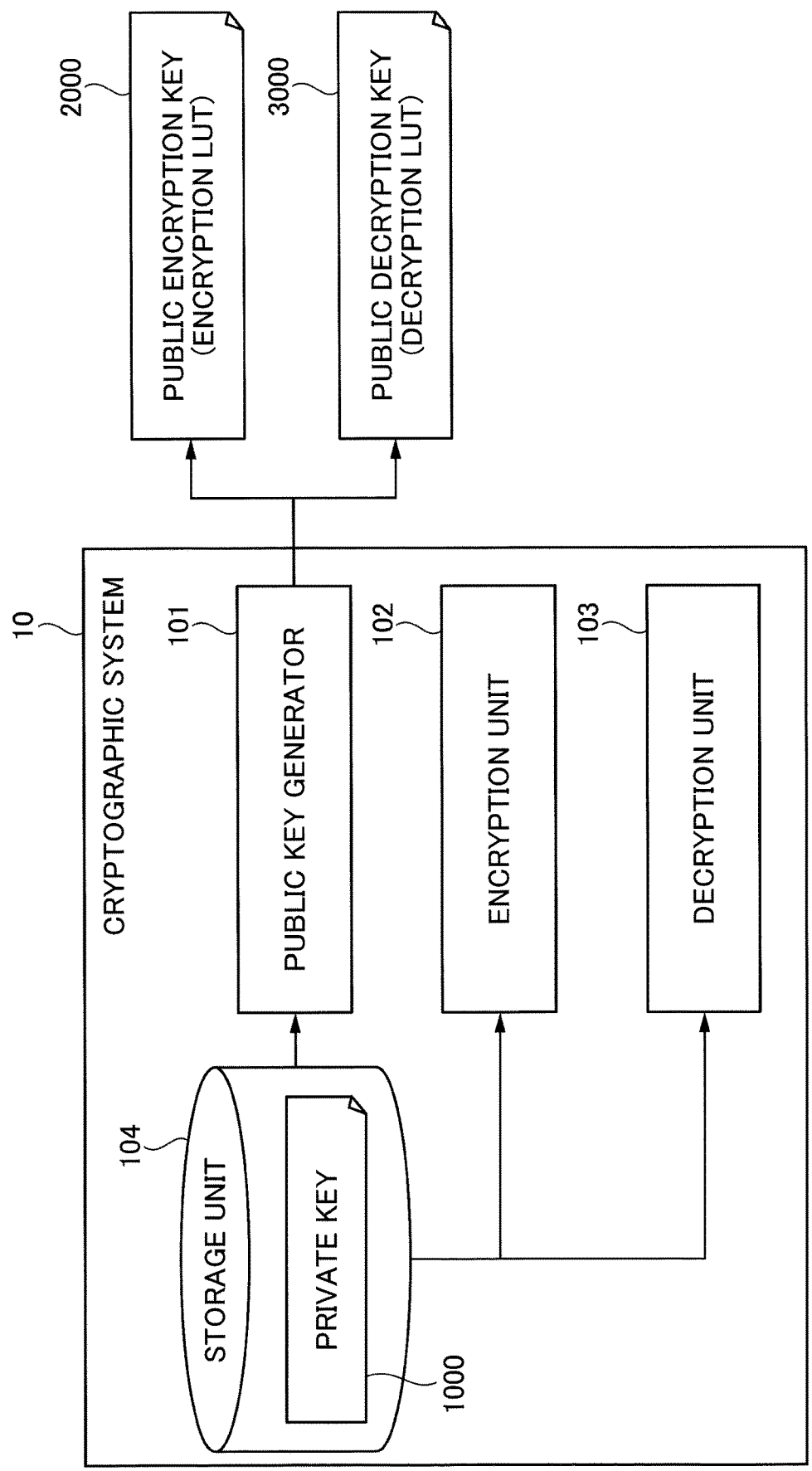

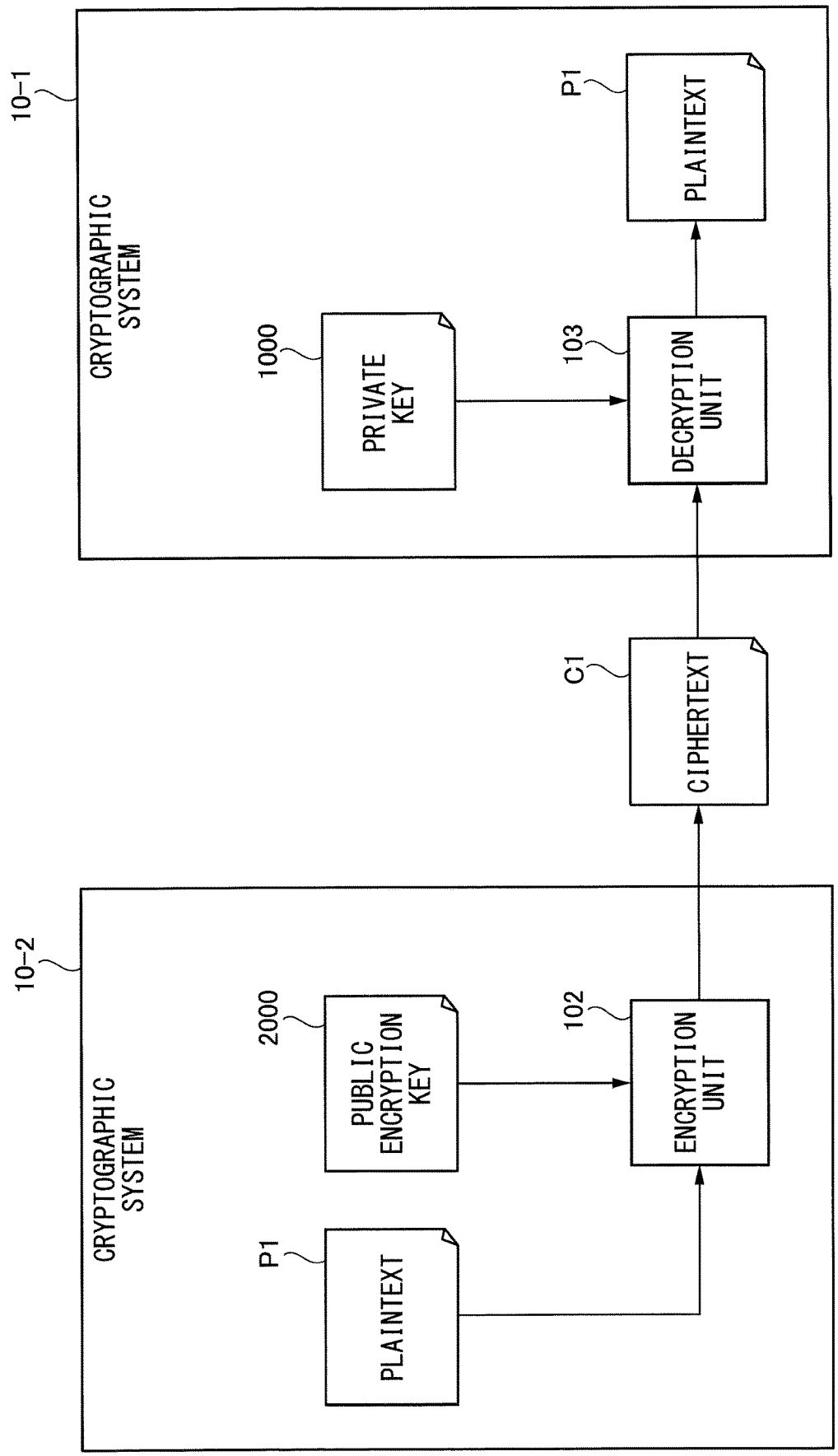

FIG.5
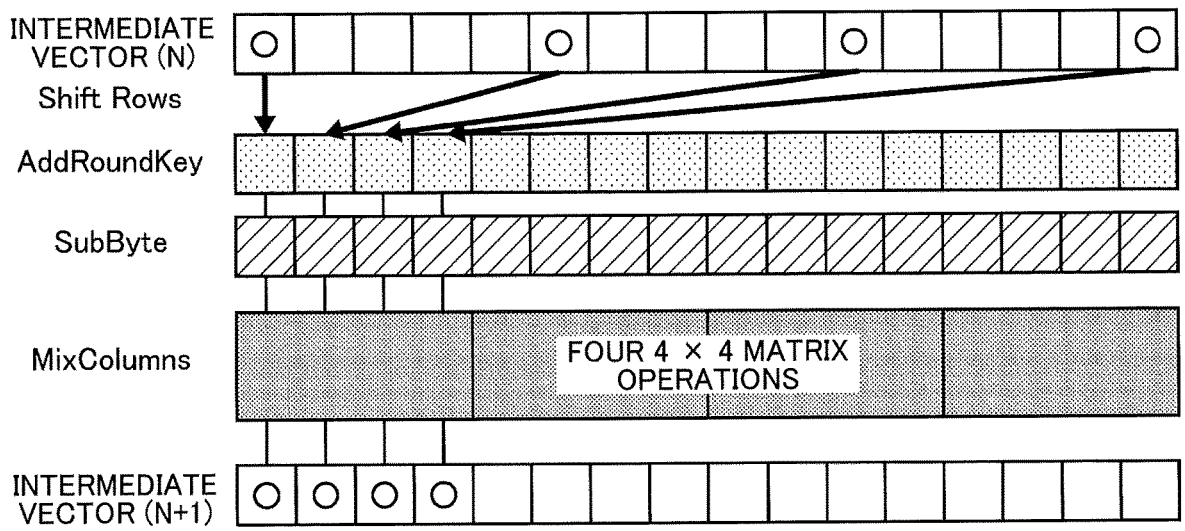
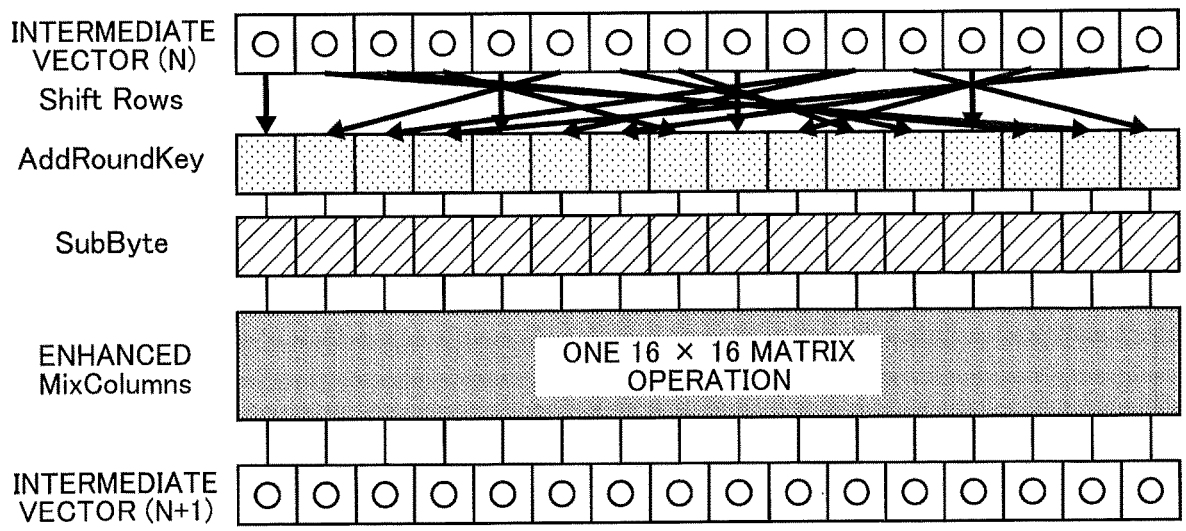

FIG.6A

TRANSFORMATION MATRIX OF ENHANCED MixColumns

| 03 | 03 | 02 | 02 | 03 | 02 | 03 | 02 | 01 | 01 | 02 | 01 | 02 | 03 | 02 | 01 |
|---|---|---|---|---|---|---|---|---|---|---|---|---|---|---|---|
| 01 | 03 | 02 | 02 | 02 | 03 | 02 | 03 | 01 | 02 | 01 | 02 | 01 | 02 | 01 | 02 |
| 02 | 01 | 03 | 03 | 02 | 02 | 03 | 02 | 03 | 01 | 01 | 01 | 02 | 01 | 03 | 01 |
| 01 | 02 | 03 | 01 | 03 | 03 | 02 | 03 | 02 | 03 | 01 | 02 | 01 | 02 | 02 | 03 |
| 03 | 01 | 02 | 02 | 03 | 03 | 01 | 02 | 03 | 02 | 01 | 01 | 01 | 03 | 02 | 02 |
| 02 | 03 | 01 | 02 | 01 | 03 | 02 | 03 | 02 | 03 | 03 | 02 | 01 | 02 | 03 | 01 |
| 01 | 02 | 03 | 01 | 03 | 01 | 01 | 02 | 02 | 02 | 03 | 03 | 03 | 02 | 02 | 03 |
| 02 | 01 | 02 | 03 | 02 | 02 | 03 | 01 | 03 | 02 | 02 | 02 | 02 | 03 | 02 | 01 |
| 01 | 02 | 01 | 02 | 01 | 03 | 02 | 02 | 02 | 03 | 03 | 03 | 03 | 02 | 03 | 01 |
| 01 | 01 | 02 | 03 | 02 | 03 | 01 | 02 | 01 | 03 | 01 | 01 | 02 | 02 | 02 | 02 |
| 03 | 01 | 01 | 02 | 01 | 02 | 02 | 03 | 02 | 03 | 02 | 03 | 03 | 02 | 02 | 01 |
| 02 | 03 | 02 | 01 | 02 | 01 | 01 | 02 | 01 | 03 | 01 | 02 | 01 | 03 | 02 | 02 |
| 03 | 02 | 01 | 01 | 01 | 01 | 01 | 01 | 03 | 02 | 03 | 01 | 02 | 02 | 03 | 01 |
| 02 | 03 | 01 | 01 | 03 | 01 | 02 | 01 | 02 | 03 | 02 | 02 | 01 | 01 | 03 | 02 |
| 02 | 02 | 03 | 03 | 02 | 02 | 03 | 01 | 03 | 01 | 01 | 01 | 02 | 03 | 03 | 03 |
| 03 | 02 | 02 | 02 | 03 | 01 | 02 | 02 | 03 | 02 | 01 | 03 | 01 | 01 | 01 | 03 |

FIG.6B

INVERSE TRANSFORMATION MATRIX OF ENHANCED InvMixColumns

| F9 | BF | 11 | DA | BF | DA | DA | 32 | 32 | 32 | 9C | 9C | F9 | 57 | DA | F9 |
|----|----|----|----|----|----|----|----|----|----|----|----|----|----|----|----|
| F9 | F9 | BF | 11 | DA | BF | DA | DA | 32 | 32 | 32 | 9C | 9C | F9 | 57 | DA |
| DA | F9 | F9 | BF | 11 | DA | BF | DA | DA | 32 | 32 | 32 | 9C | 9C | F9 | 57 |
| 57 | DA | F9 | F9 | BF | 11 | DA | BF | DA | DA | 32 | 32 | 32 | 9C | 9C | F9 |
| F9 | 57 | DA | F9 | F9 | BF | 11 | DA | BF | DA | DA | 32 | 32 | 32 | 9C | 9C |
| 9C | F9 | 57 | DA | F9 | F9 | BF | 11 | DA | BF | DA | DA | 32 | 32 | 32 | 9C |
| 9C | 9C | F9 | 57 | DA | F9 | F9 | BF | 11 | DA | BF | DA | DA | 32 | 32 | 32 |
| 32 | 9C | 9C | F9 | 57 | DA | F9 | F9 | BF | 11 | DA | BF | DA | DA | 32 | 32 |
| 32 | 32 | 9C | 9C | F9 | 57 | DA | F9 | F9 | BF | 11 | DA | BF | DA | DA | 32 |
| 32 | 32 | 32 | 9C | 9C | F9 | 57 | DA | F9 | F9 | BF | 11 | DA | BF | DA | DA |
| DA | 32 | 32 | 32 | 9C | 9C | F9 | 57 | DA | F9 | F9 | BF | 11 | DA | BF | DA |
| DA | DA | 32 | 32 | 32 | 9C | 9C | F9 | 57 | DA | F9 | F9 | BF | 11 | DA | BF |
| BF | DA | DA | 32 | 32 | 32 | 9C | 9C | F9 | 57 | DA | F9 | F9 | BF | 11 | DA |
| DA | BF | DA | DA | 32 | 32 | 32 | 9C | 9C | F9 | 57 | DA | F9 | F9 | BF | 11 |
| 11 | DA | BF | DA | DA | 32 | 32 | 32 | 9C | 9C | F9 | 57 | DA | F9 | F9 | BF |
| BF | 11 | DA | BF | DA | DA | 32 | 32 | 32 | 9C | 9C | F9 | 57 | DA | F9 | F9 |

FIG.7A

TRANSFORMATION MATRIX OF ENHANCED MixColumns

| 02 | 02 | 02 | 02 | 02 | 02 | 02 | 02 | 02 | 02 | 02 | 02 | 02 | 02 | 02 | 03 |
| --- | --- | --- | --- | --- | --- | --- | --- | --- | --- | --- | --- | --- | --- | --- | --- |
| 03 | 02 | 02 | 02 | 02 | 02 | 02 | 02 | 02 | 02 | 02 | 02 | 02 | 02 | 02 | 02 |
| 02 | 03 | 02 | 02 | 02 | 02 | 02 | 02 | 02 | 02 | 02 | 02 | 02 | 02 | 02 | 02 |
| 02 | 02 | 03 | 02 | 02 | 02 | 02 | 02 | 02 | 02 | 02 | 02 | 02 | 02 | 02 | 02 |
| 03 | 02 | 02 | 03 | 02 | 02 | 02 | 02 | 02 | 02 | 02 | 02 | 02 | 02 | 02 | 02 |
| 02 | 02 | 02 | 02 | 03 | 02 | 02 | 02 | 02 | 02 | 02 | 02 | 02 | 02 | 02 | 02 |
| 02 | 03 | 02 | 02 | 02 | 03 | 02 | 02 | 02 | 02 | 02 | 02 | 02 | 02 | 02 | 02 |
| 02 | 02 | 02 | 02 | 02 | 02 | 03 | 02 | 02 | 02 | 02 | 02 | 02 | 02 | 02 | 02 |
| 02 | 02 | 02 | 02 | 02 | 02 | 02 | 03 | 02 | 02 | 02 | 02 | 02 | 02 | 02 | 02 |
| 03 | 02 | 02 | 02 | 02 | 02 | 02 | 02 | 03 | 02 | 02 | 02 | 02 | 02 | 02 | 02 |
| 02 | 03 | 02 | 02 | 03 | 02 | 02 | 02 | 02 | 03 | 02 | 02 | 02 | 02 | 02 | 02 |
| 02 | 02 | 03 | 02 | 02 | 02 | 02 | 02 | 02 | 02 | 03 | 02 | 02 | 02 | 02 | 02 |
| 02 | 02 | 02 | 03 | 02 | 02 | 02 | 02 | 02 | 02 | 02 | 03 | 02 | 02 | 02 | 02 |
| 02 | 02 | 02 | 02 | 03 | 02 | 02 | 02 | 02 | 02 | 02 | 02 | 03 | 02 | 02 | 02 |
| 02 | 02 | 02 | 02 | 02 | 03 | 02 | 02 | 02 | 02 | 02 | 02 | 02 | 03 | 02 | 02 |
| 02 | 02 | 02 | 02 | 02 | 02 | 02 | 03 | 02 | 02 | 02 | 02 | 02 | 02 | 02 | 03 |

FIG.7B

INVERSE TRANSFORMATION MATRIX OF ENHANCED InvMixColumns

| 02 | 02 | 02 | 02 | 02 | 03 | 02 | 02 | 02 | 02 | 02 | 02 | 02 | 02 | 02 | 03 |
|----|----|----|----|----|----|----|----|----|----|----|----|----|----|----|----|
| 03 | 02 | 02 | 02 | 02 | 02 | 02 | 02 | 02 | 02 | 02 | 02 | 02 | 02 | 03 | 02 |
| 02 | 03 | 02 | 02 | 02 | 02 | 02 | 02 | 02 | 02 | 02 | 02 | 02 | 03 | 02 | 02 |
| 02 | 02 | 03 | 02 | 02 | 02 | 02 | 02 | 02 | 02 | 02 | 02 | 03 | 02 | 02 | 02 |
| 02 | 02 | 02 | 03 | 02 | 02 | 02 | 02 | 02 | 02 | 02 | 03 | 02 | 02 | 02 | 02 |
| 02 | 02 | 02 | 02 | 03 | 02 | 02 | 02 | 02 | 02 | 03 | 02 | 02 | 02 | 02 | 02 |
| 02 | 02 | 02 | 02 | 02 | 02 | 03 | 02 | 02 | 03 | 02 | 02 | 02 | 02 | 02 | 02 |
| 02 | 02 | 02 | 02 | 02 | 02 | 02 | 03 | 03 | 02 | 02 | 02 | 02 | 02 | 02 | 02 |
| 02 | 02 | 02 | 02 | 02 | 02 | 03 | 02 | 02 | 03 | 02 | 02 | 02 | 02 | 02 | 02 |
| 02 | 02 | 02 | 02 | 02 | 03 | 02 | 02 | 02 | 02 | 03 | 02 | 02 | 02 | 02 | 02 |
| 02 | 02 | 02 | 02 | 03 | 02 | 02 | 02 | 02 | 02 | 02 | 03 | 02 | 02 | 02 | 02 |
| 02 | 02 | 02 | 03 | 02 | 02 | 02 | 02 | 02 | 02 | 02 | 02 | 03 | 02 | 02 | 02 |
| 02 | 02 | 03 | 02 | 02 | 02 | 02 | 02 | 02 | 02 | 02 | 02 | 02 | 03 | 02 | 02 |
| 02 | 03 | 02 | 02 | 02 | 02 | 02 | 02 | 02 | 02 | 02 | 02 | 02 | 02 | 03 | 02 |
| 03 | 02 | 02 | 02 | 02 | 02 | 02 | 02 | 02 | 02 | 02 | 02 | 02 | 02 | 02 | 03 |
| 02 | 02 | 02 | 02 | 02 | 02 | 02 | 03 | 03 | 02 | 02 | 02 | 02 | 02 | 02 | 02 |

INFORMATION PROCESSING APPARATUS AND INFORMATION PROCESSING METHOD

CROSS-REFERENCE TO RELATED APPLICATION

This application is based upon and claims priority to Japanese Patent Application No. 2019-171450, filed on Sep. 20, 2019, the entire contents of which are incorporated herein by reference.

BACKGROUND OF THE INVENTION

1. Field of the Invention

The present disclosure relates to an information processing apparatus, an information processing method, and a non-transitory computer-readable storage medium for storing a program.

2. Description of the Related Art

In the Internet of Things (IoT), which is represented as a new technology in the era of interconnection, various devices are connected to a communication network. Although many of these devices are implemented with low cost, the devices are equipped with, for example, microprocessors to achieve applications and are equipped with various cryptographic functions as security measures.

In general encryption of communication channels, after authentication is performed and a key is exchanged using public key cryptography, data is often encrypted by symmetric key cryptography using the exchanged key. However, devices implemented with low cost require much time to perform operations of the public key cryptography. With respect to this, a multiple length integer arithmetic device that can achieve a faster operation of the pairing-based cryptography, which is one approach in the public key cryptography, has been known (see Patent Document 1, for example).

In the related art described above, it is necessary to mount a specific multiple length integer arithmetic device to a device equipped with a cryptographic function. Additionally, it is difficult to increase the performance enough to reduce the order of magnitude of the operation amount.

Embodiments of the present invention have been made in view of the description above, and it is desirable to reduce the operation amount of public key cryptography.

RELATED-ART DOCUMENTS

Patent Document

[Patent Document 1] Japanese Laid-open Patent Publication No. 2014-137415

SUMMARY OF THE INVENTION

According to one aspect of an embodiment, an information processing apparatus includes a memory, and a processor coupled to the memory and configured to generate, from a common key used for symmetric key cryptography, and from either an encryption process using the common key or a decryption process using the common key, an encryption lookup table corresponding to the encryption process or a decryption lookup table corresponding to the decryption process by using white box cryptography, and disseminate the generated encryption lookup table or the generated decryption lookup table as a public key.

According to at least one embodiment, the operation amount of the public key cryptography can be reduced.

BRIEF DESCRIPTION OF THE DRAWINGS

FIG. 1 is a drawing illustrating an example of a functional configuration of a cryptographic system according to a present embodiment;

FIG. 2A is a drawing for describing a first example of a use form of the cryptographic system;

FIG. 5 is a drawing for describing an example of replacement of MixColumns processing;

FIG. 6A is a drawing illustrating an example of a matrix used for enhanced MixColumns processing and FIG. 6B is a drawing illustrating an example of a matrix used for enhanced InvMixColumns processing (Example 1); and FIG. 7A is a drawing illustrating an example of a matrix used for the enhanced MixColumns processing and FIG. 7B is a drawing illustrating an example of a matrix used for the enhanced InvMixColumns processing (Example 2).

DETAILED DESCRIPTION OF THE EMBODIMENTS

Figure 2B:
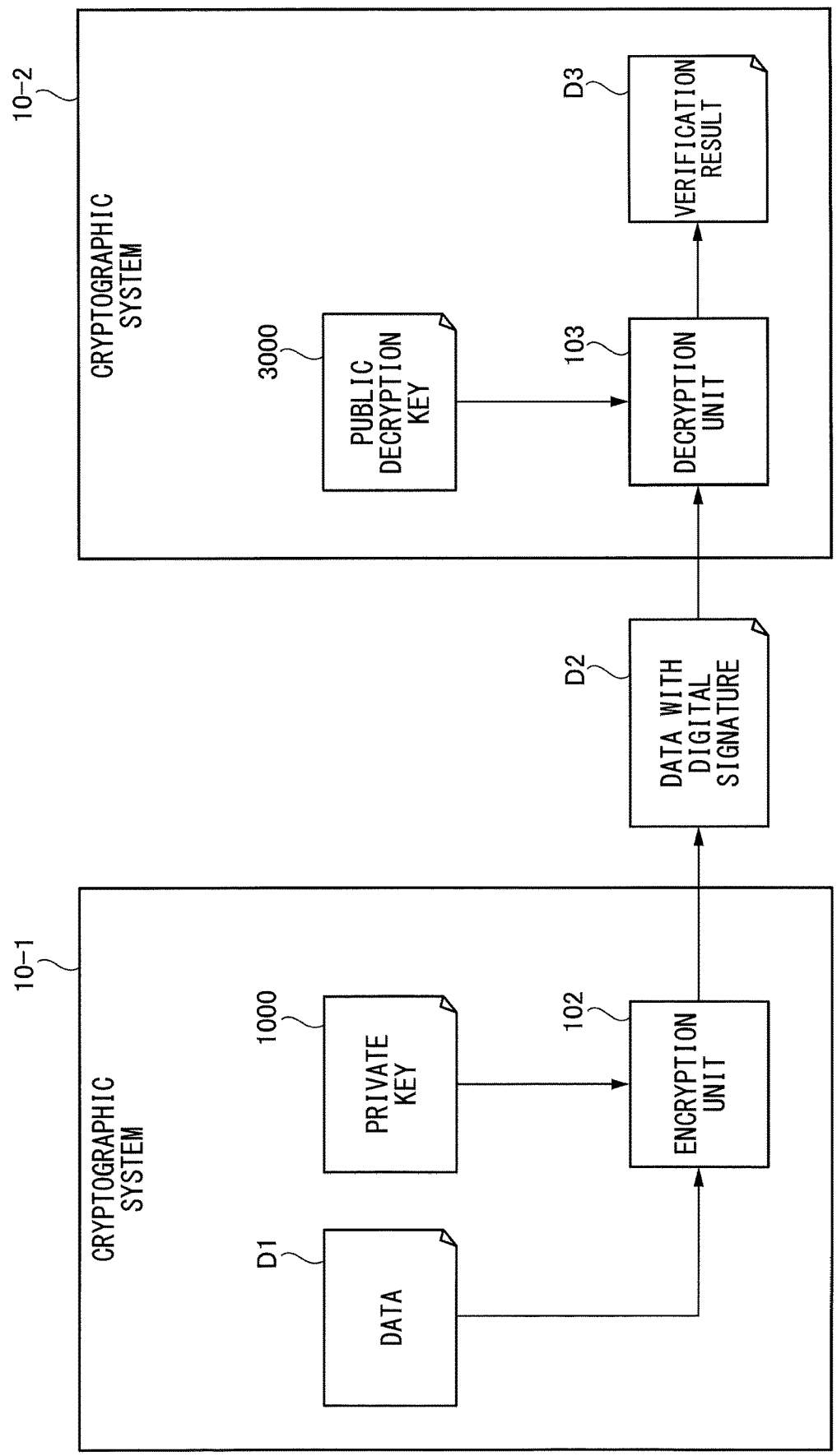
FIG. 2B is a drawing for describing a second example of a use form of the cryptographic system.

In the following, the embodiments according to the present invention will be described. In the present embodiment, a cryptographic system 10 that reduces the operation amount of the public key cryptography by achieving the public key cryptography using symmetric key cryptography with white box cryptography (WBC), will be described. Here, as an example, the cryptographic system 10 according to the present embodiment is an embedded system in which a general microprocessor or the like is mounted. The embedded system is embedded in, for example, an industrial device or a home appliance, and is a system that can achieve a specific function. Specifically, for example, the cryptographic system 10 according to the present embodiment can be incorporated into a smart meter used for the HEMS (Home Energy Management System).

However, the cryptographic system 10 according to the present embodiment is not limited to the embedded system. The cryptographic system 10, for example, may be various terminals or devices such as a personal computer (PC), a smartphone, and a tablet terminal.

<Functional Configuration>

First, a functional configuration of the cryptographic system 10 according to the present embodiment will be described with reference to FIG. 1. FIG. 1 is a drawing illustrating an example of the functional configuration of the cryptographic system 10 according to the present embodiment.

As illustrated in FIG. 1, the cryptographic system 10 according to the present embodiment includes a public key generator 101, an encryption unit 102, a decryption unit 103, and a storage unit 104.

The storage unit 104 stores a common key used for the symmetric key cryptography as a private key 1000 for the public key cryptography. In the present embodiment, for example, the symmetric key cryptography is the Advanced Encryption Standard (AES). In addition to the private key 1000, any information (for example, plaintext to be encrypted, data to which a digital signature using the private key 1000 will be attached, and so on) may be stored in the storage unit 104.

The public key generator 101 generates an encryption lookup table that is formed as a lookup table (LUT) for an encryption process of the symmetric key cryptography using the private key 1000 (i.e., the common key of the symmetric key cryptography) stored in the storage unit 104 by using the WBC. In the present embodiment, the public key cryptography is achieved by using the encryption lookup table as a public key for encrypting plaintext with the public key cryptography. Hereinafter, the encryption lookup table generated by the public key generator 101 is also referred to as a public encryption key 2000.

The public key generator 101 generates a decryption lookup table that is formed as a lookup table for a decryption process of the symmetric key cryptography using the private key 1000 (i.e., the common key of the symmetric key cryptography) stored in the storage unit 104 by using the WBC. In the present embodiment, the public key cryptography is achieved by using the decryption lookup table as a public key for performing a digital signature to which the public key cryptography is applied. Hereinafter, the decryption lookup table generated by the public key generator 101 is also referred to as a public decryption key 3000.

In the WBC, the encryption lookup table or the decryption lookup table is generated by combining a common key, various fixed values, and so on, with the encryption process or the decryption process. At this time, it is difficult to estimate the common key from the encryption lookup table and the decryption lookup table due to the decryption resistance of the WBC. Moreover, since the encryption process and the decryption process differ in processing contents and differ in random numbers used for generating the encryption lookup table and the decryption lookup table, the encryption lookup table and the decryption lookup table are different from each other, and it is impossible to calculate the decryption lookup table from the encryption lookup table or calculate the encryption lookup table from the decryption lookup table.

Here, the cryptographic system 10 according to the present embodiment may generate either the public encryption key 2000 or the public decryption key 3000, or may generate both the public encryption key 2000 and the public decryption key 3000. However, when both the public encryption key 2000 and the public decryption key 3000 are generated, different common keys are used when the public encryption key 2000 is generated and when the public decryption key 3000 is generated, because even if a common key is unknown, encryption and decryption by the common key can be performed using a public encryption key and a public decryption key generated from the common key.

The encryption unit 102 generates data with a digital signature by using the private key 1000 stored in the storage unit 104 and data to which the digital signature will be attached, when performing a digital signature to which the public key cryptography is applied. The data with the digital signature is verified by another cryptographic system 10 that has received the data with the digital signature, using the public decryption key 3000.

The encryption unit 102 encrypts the plaintext by using a public encryption key generated by another cryptographic system 10 and generates the ciphertext. The public encryption key generated by another cryptographic system 10 is stored, for example, in the storage unit 104.

The decryption unit 103 decrypts the ciphertext encrypted using the public encryption key 2000, by using the private key 1000 stored in the storage unit 104. The ciphertext is data encrypted using the public encryption key 2000 by another cryptographic system 10.

The decryption unit 103 verifies the data with the digital signature by using the public decryption key generated by another cryptographic system 10. The public decryption key generated by another cryptographic system 10 is stored, for example, in the storage unit 104.

The functional configuration of the cryptographic system 10 illustrated in FIG. 1 is an example and may be another configuration. For example, the cryptographic system 10 illustrated in FIG. 1 may include only either the encryption unit 102 or the decryption unit 103.

<Use Form of the Cryptographic System 10>

As an example of a use form of the cryptographic system 10, a use form in which cryptographic communication between two cryptographic systems 10 is performed using the public key cryptography, and a use form in which the data with the digital signature to which the public key cryptography is applied, is communicated between two cryptographic systems 10, will be described. Hereinafter, one of these two cryptographic systems 10 is referred to as a "cryptographic system 10-1" and the other is referred to as a "cryptographic system 10-2". The following description assumes that the public encryption key 2000 and the public decryption key 3000 are generated by the cryptographic system 10-1 (i.e., the public encryption key 2000 and the public decryption key 3000 are generated using the private keys 1000 of the cryptographic system 10-1).

First, a use form in which the cryptographic communication between the cryptographic system 10-1 and the cryptographic system 10-2 is performed using the public key cryptography will be described with reference to FIG. 2A. FIG. 2A is a drawing for describing a first example of the use form of the cryptographic system 10.

As illustrated in FIG. 2A, the encryption unit 102 of the cryptographic system 10-2 generates ciphertext C1 by encrypting plaintext P1 using the public encryption key 2000 and transmits the ciphertext C1 to the cryptographic system 10-1. When receiving the ciphertext C1, the decryption unit 103 of the cryptographic system 10-1 generates the plaintext 21 by decrypting the ciphertext C1 using the private key 1000.

Thus, the ciphertext C1 encrypted using the public encryption key 2000 in the cryptographic system 10-2 is decrypted using the private key 1000 in the cryptographic system 10-1. In this case, since the present embodiment employs the AES as the symmetric key cryptography, the cryptographic system 10-2 can perform encryption with the operation amount equivalent to the operation amount of the AES. The operation amount required for performing decryption in the cryptographic system 10-1 is similar to the operation amount of a decryption process by the normal AES.

Next, the use form in which the data with the digital signature to which the public key cryptography is applied, is communicated between the cryptographic system 10-1 and the cryptographic system 10-2, will be described with reference to FIG. 2B. FIG. 2B is a drawing illustrating a second example of the use form of the cryptographic system 10.

As illustrated in FIG. 2B, the encryption unit 102 of the cryptographic system 10-1 generates data D2 with the digital signature from data D1, to which the digital signature using the private key 1000 is to be attached, and transmits the data D2 with the digital signature to the cryptographic system 10-2. The encryption unit 102 of the cryptographic system 10-1, for example, generates the digital signature by encrypting a hash value of the data D1 using the private key 1000, and generates the data D2 with the digital signature by adding the digital signature to the data D1.

When receiving the data D2 with the digital signature, the decryption unit 103 of the cryptographic system 10-2 verifies the data D2 with the digital signature by using the public decryption key 3000 and generates a verification result D3. The decryption unit 103 of the cryptographic system 10-2, for example, verifies whether the digital signature included in the data D2 with digital signature can be decrypted using the public decryption key 3000 and verifies whether a hash value obtained by decrypting the digital signature matches the hash value of the data part included in the data D2 with the digital signature, to generate the verification result D3.

As described, the data D2 with the digital signature generated using the private key 1000 in the cryptographic system 10-1 is decrypted using the public decryption key 3000 in the cryptographic system 10-2. In this case, since the present embodiment employs the AES as the symmetric key cryptography, the cryptographic system 10-2 can decrypt the digital signature with the operation amount equivalent to the operation amount of the decryption process of the normal AES. The operation amount required to perform encryption in the cryptographic system 10-1 is similar to the operation amount of the encryption process by the normal AES.

<Hardware Configuration>

Figure 3:
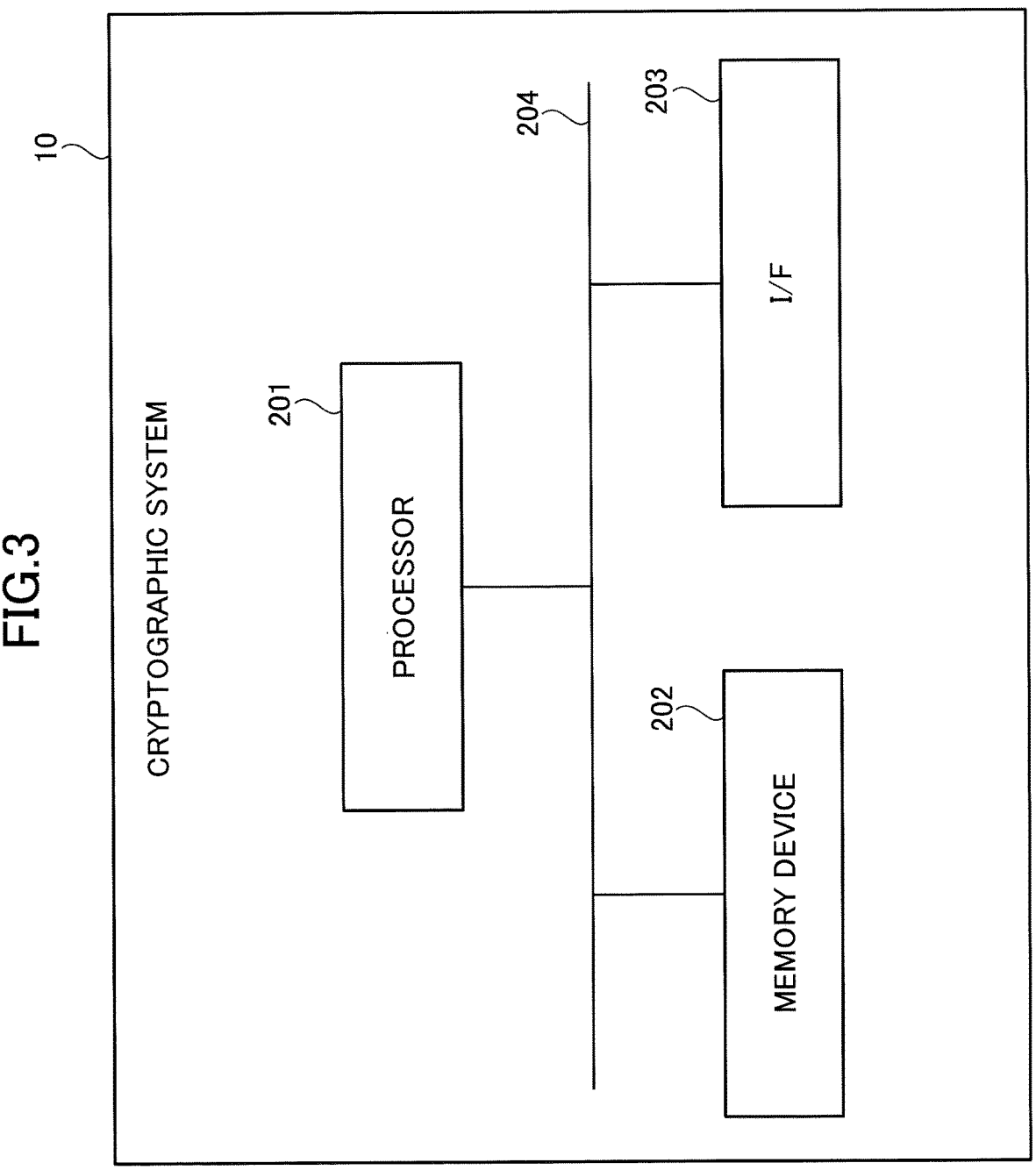
FIG. 3 is a drawing illustrating an example of a hardware configuration of the cryptographic system according to the present embodiment.

Next, a hardware configuration of the cryptographic system 10 according to the present embodiment will be described with reference to FIG. 3. FIG. 3 is a drawing illustrating an example of the hardware configuration of the cryptographic system 10 according to the present embodiment.

As illustrated in FIG. 3, the cryptographic system 10 according to the present embodiment includes a processor 201, a memory device 202, and an I/F 203. Each of these hardware is connected through a bus 204 to communicate with each other.

The processor 201 is, for example, an arithmetic operation device, such as a central processing unit (CPU) or a micro processing unit (MPU). Each functional unit (i.e., the public key generator 101, the encryption unit 102, and the decryption unit 103) included in the cryptographic system 10 is achieved by one or more programs stored in the memory device 202 causing the processor 201 to execute a process.

The memory device 202 may be, for example, various storage devices such as random access memory (RAM), a read only memory (ROM), a flash memory, and so on. The storage unit 104 included in the cryptographic system 10 is achieved, for example, by the memory device 202.

The I/F 203 is an interface for inputting data into the cryptographic system 10 and outputting data from the cryptographic system 10.

The cryptographic system 10 according to the present embodiment can achieve various processes with the hardware configuration illustrated in FIG. 3. The hardware configuration illustrated in FIG. 3 is an example, and the cryptographic system 10 according to the present embodiment may have another hardware configuration. For example, the cryptographic system 10 according to the present embodiment may include multiple processors 201 and multiple memory devices 202.

<Public Key Generation Process>

Figure 4:
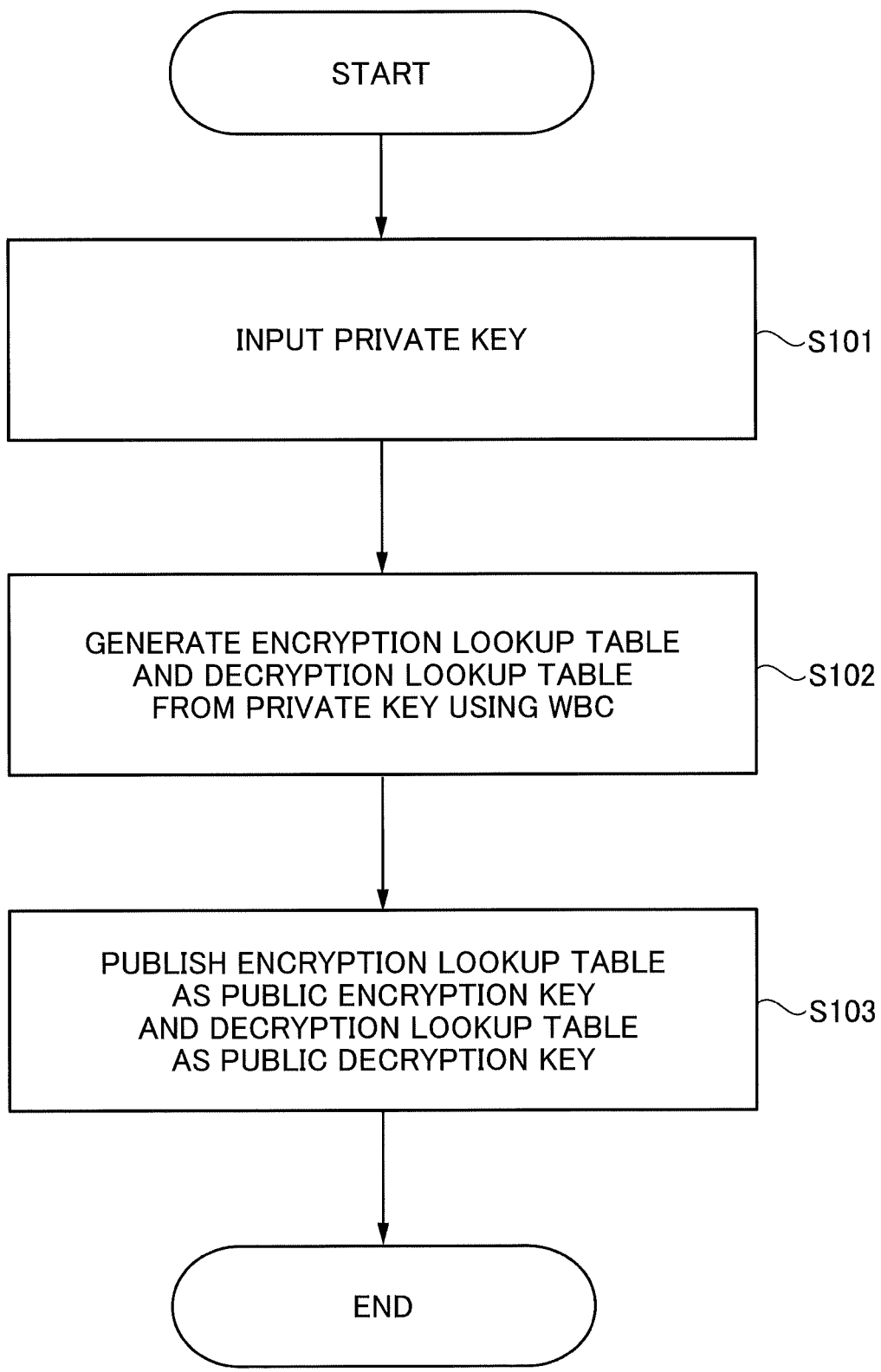
FIG. 4 is a flowchart illustrating an example of a public key generation process according to the present embodiment.

Next, a public key generation process in which the cryptographic system 10 according to the present embodiment generates at least either the public encryption key 2000 or the public decryption key 3000, will be described with reference to FIG. 4. FIG. 4 is a flowchart illustrating an example of the public key generation process according to the present embodiment. In the following, as an example, the generation process of generating both the public encryption key 2000 and the public decryption key 3000, will be described.

First, in step S101, the public key generator 101 of the cryptographic system 10 inputs the private key 1000 stored in the storage unit 104. As described above, the public key generator 101 inputs different private keys 1000 for generating the public encryption key 2000 and the public decryption key 3000. Hereinafter, in order to distinguish between these private keys, the private key 1000 for generating the public encryption key 2000 is referred to as a "private key 1000A" and the private key 1000 for generating the public decryption key 3000 is referred to as a "private key 1000B".

Next, in step S102, the public key generator 101 of the cryptographic system 10 generates the encryption lookup table from the encryption process of the symmetric key cryptography that uses the private key 1000A input in step S101 by using the WBC. Similarly, in step S102, the public key generator 101 of the cryptographic system 10 generates the decryption lookup table from the decryption process of the symmetric key cryptography that uses the private key 1000B input in step S101 by using the WBC.

Finally, in step S103, the public key generator 101 of the cryptographic system 10 disseminates the encryption lookup table generated in step S102 as the public encryption key 2000. Similarly, in step S103, the public key generator 101 of the cryptographic system 10 disseminates the decryption lookup table generated in step S102 as the public decryption key 3000.

The public key generator 101 may disseminate the public encryption key 2000 or the public decryption key 3000 in a desired manner. For example, the public key generator 101 may disseminate the public encryption key 2000 or the public decryption key 3000 by transmitting the public encryption key 2000 or the public decryption key 3000 to a device to be communicated with (i.e., another cryptographic system 10), or by storing the public encryption key 2000 or the public decryption key 3000 in a database server or the like that can be accessed by a device to be communicated with.

As a result, at least either the public encryption key 2000 or the public decryption key 3000 is disseminated as a public key, and the cryptographic system 10 according to the present embodiment can achieve the public key cryptography using the public key (or the digital signature to which the public key cryptography is applied). Moreover, since the present embodiment employs the AES as the symmetric key cryptography, the public key cryptography using the public key can perform encryption and decryption with the operation amount equivalent to the operation amount of the AES.

Thus, compared with the public key cryptography such as the Rivest-Shamir-Adleman cryptography (RSA), the operation amount required for encryption and decryption can be significantly reduced. More specifically, since it is known that the operation time of the RSA 3076 is about $2^{20}$ times longer than the operation time of the AES 128 for example, when the AES 128 is used as the symmetric key cryptography, the operation time of the public key cryptography achieved by the symmetric key cryptography can be reduced to about $\frac{1}{2}^{20}$ compared with the RSA 3076. Similarly, since it is known that the operation time of the RSA 15360 is about $2^{26}$ times longer than the operation time of the AES 256 for example, when the AES 256 is used as the symmetric key cryptography, the operation time of the public key cryptography achieved by the symmetric key cryptography can be reduced to about $\frac{1}{2}^{26}$ compared with the RSA 15360.

<Enhancement of the AES>

In the present embodiment, the AES is employed as the symmetric key cryptography, but a method of enhancing the AES will be described in order to further enhance the security of the public key cryptography achieved by the symmetric key cryptography. In the present embodiment, the AES enhanced by this method is referred to as the "enhanced AES". By using the enhanced AES instead of the AES as the symmetric key cryptography, the security of the public key cryptography achieved by the symmetric key cryptography can be further enhanced.

First, as illustrated in FIG. 5, in one sub round at the nth round of the AES (where n is an integer greater than or equal to 0), ShiftRows processing, AddRoundKey processing, SubByte processing, and MixColumns processing are performed on predetermined 4 bytes (i.e., 32 bits) data of the intermediate vector at the nth round as input, and predetermined 4 bytes data of the intermediate vector at the (n+1)th round is output. The sub round is repeated four times to complete the nth round process. In this case, in the MixColumns processing, a 4×4 matrix operation is performed once per one sub round.

The intermediate vector input at the zeroth round is plaintext, and the intermediate vector output in the final round is ciphertext.

As described above, since the public encryption key 2000 is the encryption lookup table, it is possible to search for the intermediate vector at the nth round by using the public encryption key 2000 and the intermediate vector at the (n+1)th round. At this time, 4 bytes data is obtained from 4 bytes data in one sub round, and the search cost is 4 bytes data, that is, 32 bits, which is the unit of the MixColumns processing included in the intermediate vector at the (n+1)th round. Thus, when the AES is used as the symmetric key cryptography, the plaintext can be determined from the ciphertext by repeating the search with the search cost of 32 bits.

Then, as illustrated in FIG. 5, the MixColumns processing of the AES is replaced with enhanced MixColumns processing, in which a 16×16 matrix operation is performed once per one round. The "enhanced AES" is the AES where the MixColumns processing is replaced with the enhanced MixColumns processing. The search cost is 16 bytes (i.e., 128 bits) because the enhanced AES obtains 16 bytes data from 16 bytes data per one round. Therefore, by employing the enhanced AES as the symmetric key cryptography, it is impossible to determine the plaintext from the ciphertext within the realistic operation time, and the security of the public key cryptography achieved by the symmetric key cryptography can be further enhanced.

Here, for convenience of explanation, the MixColumns processing in the encryption process is replaced with the enhanced MixColumns processing in FIG. 5. In the enhanced AES, InvMixColumns processing in the decryption process is similarly replaced with enhanced InvMixColumns processing. In the enhanced InvMixColumns processing, a 16×16 matrix operation is performed once per one round.

Here, since the enhanced AES has a structure similar to the AES, the encryption strength of the enhanced AES is equivalent to the encryption strength of the AES. The operation amount of the enhanced MixColumns processing is four times larger because the size of the transformation matrix used in the matrix operation is changed from 4×4 to 16×16.

<Matrices Used for the Enhanced MixColumns Processing and the Enhanced InvMixColumns Processing>

Here, examples of a transformation matrix used for the enhanced MixColumns processing and an inverse transformation matrix used for the enhanced InvMixColumns processing, will be described. Hereinafter, each element of the transformation matrix and the inverse transformation matrix is represented as a hexadecimal number.

First, as a basic condition, it is preferable not to use "00" for each element of the transformation matrix so that data related to each 1-byte data included in the intermediate vector at the (n+1)th round (i.e., data of the intermediate vector at the nth round) is 16 bytes.

In a manner similar to the AES, the (i+1)th row (where i=1, . . . , 15) of the transformation matrix is a row in which the i-th row is rotated by one element in a predetermined direction (either the right direction or the left direction). That is, for example, if the predetermined direction is the right direction, and the i-th row is represented as [a1, a2, a16], the (i+1)th row is represented as [a16, a1, . . . , a15]. Here, it can also be said that the (j+1)th column (where j=1, . . . , 15) of the transformation matrix is a column in which the j-th column is rotated by one element in a predetermined direction (either above or below).

The inverse transformation matrix is represented by an inverse matrix of the transformation matrix. In the inverse transformation matrix, the (i+1)th row (where i=1, . . . , 15) is also a row in which the i-th row is rotated by one element in the predetermined direction.

Example 1

FIG. 6A and FIG. 63 illustrate Example 1, which is an example of a transformation matrix used for the enhanced MixColumns processing and an inverse transformation matrix used for the enhanced InvMixColumns processing. FIG. 6A is a drawing illustrating an example of a matrix used for the enhanced MixColumns processing and FIG. 6B is a drawing illustrating an example of a matrix used for the enhanced InvMixColumns processing (Example 1).

Since the enhanced MixColumns processing is a matrix operation based on an irreducible polynomial on the Galois field, when the enhanced MixColumns processing is operated using the processor 201, such as the CPU, as the symmetric key cryptography, the number of operation steps varies depending on values to be multiplied (i.e., the number of steps is proportional to the sum of bit widths from respective lowest bits when the values to be multiplied are converted into binary numbers). Thus, when each element of the transformation matrix used for the enhanced MixColumns processing is a value with a small bit width (i.e., a small value), operation steps can be reduced.

As illustrated in FIG. 6A, Example 1 is an example in which the elements of the transformation matrix are composed of "01", "02", and "03". However, as illustrated in FIG. 6B, in Example 1, the elements of the inverse transform matrix are not small values, and are composed of disordered values.

Example 2

FIG. 7A and FIG. 7B illustrate Example 2, which is a transformation matrix used for the enhanced MixColumns processing and an inverse transformation matrix used for the enhanced InvMixColumns processing. FIG. 7A is a drawing illustrating an example of a matrix used for the enhanced MixColumns processing and FIG. 7B is a drawing illustrating an example of a matrix used for the enhanced InvMixColumns processing (Example 2).

In Example 2, the elements of the transformation matrix used in the enhanced MixColumns processing are composed of "02", which requires the smallest number of operation steps, and "03", which requires the second smallest number of operation steps, in order to enable fast encryption and decryption even with a small program size for an operation performed using a common key of the enhanced AES. As illustrated in FIG. 7A, the transformation matrix consists of thirteen "02"s and three "03"s per row. As illustrated in FIG. 7B, the inverse matrix of the transformation matrix (i.e., the inverse transformation matrix) also consists of thirteen "02"s and three "03"s per row. Therefore, Example 2 can reduce the number of operation steps even in the enhanced InvMixColumns processing.

As described later, the transformation matrix and the inverse transformation matrix in Example 2 are respectively used for the enhanced MixColumns processing and the enhanced InvMixColumns processing, so that operation results can be reused, and the operation amount of encryption and decryption can be reduced.

In Example 2, "02" and "03" are used to constitute the transformation matrix, but the transformation matrix is not limited to this. For example, instead of "02", "X" (where X is any even number between "02" and "FE") may be used, and instead of "03", "X+1" may be used to constitute the transformation matrix. However, since the number of operation steps is smallest when X is "02", the operation amount of the encryption and decryption can be reduced most when X is "02".

<Matrix Operations in the Enhanced MixColumns Processing and the Enhanced InvMixColumns Processing>

Here, matrix operations in the enhanced MixColumns processing and the enhanced InvMixColumns processing will be described. The input to the enhanced MixColumns processing is x, the output from the enhanced MixColumns processing is y, and x and y are represented as follows.

$x = (x_0, x_1, \ldots, x_{15})$, $x_i \in \{0, \ldots, 255\}$ $y = (y_0, y_1, \ldots, y_{15})$, $y_i \in \{0, \ldots, 255\}$ In this case, the output from the enhanced InvMixColumns processing is represented by x, and the input to the enhanced InvMixColumns processing is represented by y.

The transformation matrix used for the enhanced MixColumns processing is as follows.

$$M = \begin{bmatrix} m_{0,0} & \cdots & m_{0,15} \\ \vdots & \ddots & \vdots \\ m_{15,0} & \cdots & m_{15,15} \end{bmatrix} \quad [\text{Eq. 1}]$$

(where $m_{i,j} = m_{0,(j-i) \bmod 16}$)

Similarly, the transformation matrix used for the enhanced InvMixColumns processing is as follows.

$$M' = \begin{bmatrix} m'_{0,0} & \cdots & m'_{0,15} \\ \vdots & \ddots & \vdots \\ m'_{15,0} & \cdots & m'_{15,15} \end{bmatrix} \quad [\text{Eq. 2}]$$

(where $m'_{i,j} = m'_{0,(j-i) \bmod 16}$)

In the enhanced MixColumns processing, the matrix operation (i.e., transformation) is performed using the following equation (1).

[Eq. 3]

$$y_i = \sum_{j=0}^{15} x_j \cdot m_{i,j} = \sum_{j=0}^{15} x_j \cdot m_{0,(j-i) \bmod 16} \quad (1)$$

In the enhanced InvMixColumns processing, the matrix operation (i.e., inverse transformation) is performed using the following equation (2).

[Eq. 4]

$$x_i = \sum_{j=0}^{15} y_j \cdot m'_{i,j} = \sum_{j=0}^{15} y_j \cdot m'_{0,(j-i) \bmod 16} \quad (2)$$

In the equation (1) and the equation (2) above, the product and sum are the product and sum on the Galois field.

When the transformation matrix in Example 1 above is used, the following calculation is performed in the enhanced MixColumns processing.

$y_0 = 3 \cdot x_0 + 3 \cdot x_1 + 2 \cdot x_2 + 2 \cdot x_3 + 3 \cdot x_4 + 2 \cdot x_5 + 3 \cdot x_6 + 1 \cdot x_7 +$
$\quad 1 \cdot x_8 + 2 \cdot x_9 + 1 \cdot x_{10} + 2 \cdot x_{11} + 3 \cdot x_{12} + 1 \cdot x_{13} + 2 \cdot x_{14} + 1 \cdot x_{15}$ $y_1 = 1 \cdot x_0 + 3 \cdot x_1 + 3 \cdot x_2 + 2 \cdot x_3 + 2 \cdot x_4 + 3 \cdot x_5 + 2 \cdot x_6 + 3 \cdot x_7 +$
$\quad 1 \cdot x_8 + 1 \cdot x_9 + 2 \cdot x_{10} + 1 \cdot x_{11} + 2 \cdot x_{12} + 3 \cdot x_{13} + 1 \cdot x_{14} + 2 \cdot x_{15} \ldots$ When the inverse transformation matrix in Example 1 above is used, the following calculation is performed in the enhanced InvMixColumns processing.

$x_0 = F9 \cdot y_0 + BF \cdot y_1 + 11 \cdot y_2 + DA \cdot y_3 + BF \cdot y_4 +$
$\quad DA \cdot y_5 + DA \cdot y_6 + 32 \cdot y_7 + 32 \cdot y_8 + 32 \cdot y_9 + 9C \cdot y_{10} +$
$\quad 9C \cdot y_{11} + F9 \cdot y_{12} + 57 \cdot y_{13} + DA \cdot y_{14} + F9 \cdot y_{15}$ $x_1 = F9 \cdot y_0 + F9 \cdot y_1 + BF \cdot y_2 + 11 \cdot y_3 + DA \cdot y_4 +$
$\quad BF \cdot y_5 + DA \cdot y_6 + DA \cdot y_7 + 32 \cdot y_8 + 32 \cdot y_9 + 32 \cdot y_{10} +$
$\quad 9C \cdot y_{11} + 9C \cdot y_{12} + F9 \cdot y_{13} + 57 \cdot y_{14} + DA \cdot y_{15} \ldots$ As described, in Example 1, the arithmetic operation with values having long bit widths (e.g., "F9") is performed 16 times to obtain the output of 1 byte (i.e., 256 times to obtain the output of 16 bytes) in the enhanced InvMixColumns processing. Therefore, compared with Example 2, the number of operation steps is increased.

Next, when the transformation matrix in Example 2 above is used, the following calculation is performed in the enhanced MixColumns processing.

$y_0 = 2 \cdot x_0 + 2 \cdot x_1 + 2 \cdot x_2 + 2 \cdot x_3 + 2 \cdot x_4 + 2 \cdot x_5 + 2 \cdot x_6 + 3 \cdot x_7 + 2 \cdot x_8 +$
$\quad 2 \cdot x_9 + 2 \cdot x_{10} + 2 \cdot x_{11} + 3 \cdot x_{12} + 2 \cdot x_{13} + 2 \cdot x_{14} + 3 \cdot x_{15} =$ -continued $$y_1 = 3 \cdot x_0 + 2 \cdot x_1 + 2 \cdot x_2 + 2 \cdot x_3 + 2 \cdot x_4 + 2 \cdot x_5 + 2 \cdot x_6 + 2 \cdot x_7 + \\ 3 \cdot x_8 + 2 \cdot x_9 + 2 \cdot x_{10} + 2 \cdot x_{11} + 2 \cdot x_{12} + 3 \cdot x_{13} + 2 \cdot x_{14} + 2 \cdot x_{15} = \\ 2 \cdot (x_0 + x_1 + \ldots + x_{15}) + x_0 + x_8 + x_{13} \ldots$$

Thus, since each calculation of y0 to y15 includes 2·(x0+x1+ . . . +x15), the operation result of 2·(x0+x1+ . . . +x15) can be reused.

When the inverse transformation matrix in Example 2 above is used, the following calculation is performed in the enhanced InvMixColumns processing.

$$x_0 = 2 \cdot y_0 + 2 \cdot y_1 + 2 \cdot y_2 + 2 \cdot y_3 + 3 \cdot y_4 + 2 \cdot y_5 + 2 \cdot y_6 + 3 \cdot y_7 + 2 \cdot y_8 + \\ 2 \cdot y_9 + 2 \cdot y_{10} + 2 \cdot y_{11} + 2 \cdot y_{12} + 2 \cdot y_{13} + 2 \cdot y_{14} + 3 \cdot y_{15} = \\ 2 \cdot (y_0 + y_1 + \ldots + y_{15}) + y_4 + y_7 + y_{15}$$

$$x_1 = 3 \cdot y_0 + 2 \cdot y_1 + 2 \cdot y_2 + 2 \cdot y_3 + 2 \cdot y_4 + 3 \cdot y_5 + 2 \cdot y_6 + 2 \cdot y_7 + \\ 3 \cdot y_8 + 2 \cdot y_9 + 2 \cdot y_{10} + 2 \cdot y_{11} + 2 \cdot y_{12} + 2 \cdot y_{13} + 2 \cdot y_{14} + 2 \cdot y_{15} = \\ 2 \cdot (y_0 + y_1 + \ldots + y_{15}) + y_0 + y_5 + y_8 \ldots$$

Thus, since each calculation of x0 to x15 includes 2·(y0+y1+ . . . +y15), the operation result of 2·(y0+y1+ . . . +y15) can be reused.

Thus, in Example 2, when the outputs of 16 bytes are obtained in the enhanced MixColumns processing and the enhanced InvMixColumns processing, only multiplication by two, which is small, occurs, and the number of multiplication operations is also one in each calculation of x0 to x15. Therefore, when the outputs of 16 bytes are obtained in the enhanced MixColumns processing and the enhanced InvMixColumns processing, the operation amount is greatly reduced.

<Comparison of the Operation Amount>

Table 1 below shows the operation amount (i.e., the number of multiplication operations and the number of addition operations) for each of the matrix transformations and the inverse matrix transformations in the AES, Example 1, and Example 2.

Here, the matrix transformation of the AES is a matrix operation in the MixColumns processing and the inverse matrix transformation is a matrix operation in the InvMixColumns processing. With respect to this, the matrix transformations in Example 1 and Example 2 are matrix operations in the enhanced MixColumns processing, and the inverse matrix transformations are matrix operations in the enhanced InvMixColumns processing. The operation amount of the AES shown in Table 1 above is the operation amount when the matrix transformation and the inverse matrix transformation are not converted into lookup tables.

In the AES, the operation amount is calculated by multiplication of the number of elements that are values other than 1 per row in the transform matrix or the inverse transform matrix, the number of rows, and the number of transforms or inverse transforms per round). In Example 2, the operation amount is calculated by multiplication of the number of elements that are values other than 1 per row in the transformation matrix or the inverse transformation matrix and the number of rows. As shown in Table 1 above, in Example 1, the operation amounts in the enhanced MixColumns processing and the enhanced InvMixColumns processing are greater than the operation amounts in the MixColumns processing and InvMixColumns processing of the AES.

In Example 2, by the reuse of the operation result, the number of multiplication operations is one and the number of addition operations is 63 for both the matrix transformation and the inverse matrix transformation. In the matrix transformation, the number of addition operations is the sum of the number of addition operations in a portion in which the operation result is reused (that is, 2·(x$_0$+x$_1$+, . . . +x$_{15}$)) (i.e., 15 times) and the number of addition operations in a portion other than the portion in each of y0 to y15 (i.e., 3×16 times). The same applies to the inverse matrix transformation.

Therefore, in the enhanced AES to which Example 2 is applied, it is possible to significantly reduce the operation amount compared with the AES and the enhanced AES to which Example 1 is applied.

SUMMARY

As described above, the cryptographic system 10 according to the present embodiment can achieve public key cryptography that uses symmetric key cryptography by using WBC to generate lookup tables from the processes of the symmetric key cryptography (i.e., the encryption process using the common key and the decryption process using the common key). At this time, since the public key cryptography can be achieved with an operation amount equivalent to or smaller than the operation amount of the symmetric key cryptography, the operation amount can be significantly reduced compared with the conventional public key cryptography. Further, the enhanced AES is employed as the symmetric key cryptography, and rounds are configured by the enhanced MixColumns processing and the enhanced InvMixColumns processing using the transformation matrix and the inverse transformation matrix described in Example 2 above, thereby achieving higher security and further reducing the operation amount.

There are various methods in WBC, and the total table size varies depending on which method of the WBC is used

TABLE 1

| | AES | | EXAMPLE 1 | | EXAMPLE 2 | |
|---|---|---|---|---|---|---|
| | MATRIX TRANS-FORMATION | INVERSE MATRIX TRANS-FORMATION | MATRIX TRANS-FORMATION | INVERSE MATRIX TRANS-FORMATION | MATRIX TRANS-FORMATION | INVERSE MATRIX TRANS-FORMATION |
| MULTIPLICATION | 32 = 2 × 4 × 4 | 64 = 4 × 4 × 4 | 176 = 11 × 16 | 256 = 16 × 16 | 1 | |
| ADDITION | 48 = 3 × 4 × 4 | 48 = 3 × 4 × 4 | 240 = 15 × 16 | 240 = 15 × 16 | 63 = 15 + (3 × 16) | | to generate the lookup table for the enhanced AES. As an example, the total table sizes of lookup tables generated by the conventional WBC techniques for the enhanced AES 128, which enhances the AES 128, the enhanced AES 192, which enhances the AES 192, and the enhanced AES 256, which enhances the AES 256, are shown in Table 2 below. The unit is a byte.

TABLE 2

|  | ENHANCED AES-128 | ENHANCED AES-192 | ENHANCED AES-256 |
|---|---|---|---|
| CONVENTIONAL TECHNIQUE 1 | 106,496 | 114,688 | 122,880 |
| CONVENTIONAL TECHNIQUE 2 | 73,872 | 73,904 | 73,936 |
| CONVENTIONAL TECHNIQUE 3 | 593,920 | 724,992 | 856,064 |

Here, the conventional technique 1 is a WBC disclosed in Japanese Laid-open Patent Publication No. 2017-44757, the conventional technique 2 is a WBC disclosed in Japanese Laid-open Patent Publication No. 2017-216619, and the conventional technique 3 is a WBC disclosed in Japanese Laid-open Patent Publication No. 2017-167390.

The present invention is not limited to the embodiment disclosed specifically above, and various modifications and variations can be made without departing from the scope of the claims.

What is claimed is:

1. An information processing apparatus comprising:
a memory; and
a processor coupled to the memory and configured to
generate, from a common key used for symmetric key cryptography, and from either an encryption process using the common key or a decryption process using the common key, an encryption lookup table corresponding to the encryption process or a decryption lookup table corresponding to the decryption process by using white box cryptography; and
disseminate the generated encryption lookup table or the generated decryption lookup table as a public key,
wherein the symmetric key cryptography is a cryptography system in which a matrix transformation of MixColumns processing included in an AES encryption process is replaced with a matrix transformation that uses a 16×16 transform matrix, and an inverse matrix transformation of InvMixColumns processing included in an AES decryption process is replaced with a matrix transformation that uses an inverse matrix of the 16×16 transform matrix.

2. The information processing apparatus as claimed in claim 1, wherein the 16×16 transform matrix is a matrix in which each element is a small value except 0 and an (i+1)th row or column is a row or a column in which an i-th row or an i-th column is rotated by one element in a predetemined direction, where i=1, ..., 15.

3. The information processing apparatus as claimed in claim 2, wherein the 16×16 transform matrix is a matrix in which thirteen elements are M and three elements are M+1 in each row or each column, where M is an even number greater than or equal to 2 and is smaller than or equal to 254.

4. The information processing apparatus as claimed in claim 3, wherein the 16×16 transform matrix is a matrix in which thirteen elements are 2 and three elements are 3 in each row or each column.

5. An information processing method performed by a computer, the information processing method comprising:
generating, from a common key used for symmetric key cryptography, and from either an encryption process using the common key or a decryption process using the common key, an encryption lookup table corresponding to the encryption process or a decryption lookup table corresponding to the decryption process by using white box cryptography; and
disseminating the generated encryption lookup table or the generated decryption lookup table as a public key,
wherein the symmetric key cryptography is a cryptography system in which a matrix transformation of MixColumns processing included in an AES encryption process is replaced with a matrix transformation that uses a 16×16 transform matrix, and an inverse matrix transformation of InvMixColumns processing included in an AES decryption process is replaced with a matrix transformation that uses an inverse matrix of the 16×16 transform matrix.

6. A non-transitory computer-readable recording medium having stored therein a program for causing a computer to execute a method comprising:
generating, from a common key used for symmetric key cryptography, and from either an encryption process using the common key or a decryption process using the common key, an encryption lookup table corresponding to the encryption process or a decryption lookup table corresponding to the decryption process by using white box cryptography; and
disseminating the generated encryption lookup table or the generated decryption lookup table as a public key,
wherein the symmetric key cryptography is a cryptography system in which a matrix transformation of MixColumns processing included in an AES encryption process is replaced with a matrix transformation that uses a 16×16 transform matrix, and an inverse matrix transformation of InvMixColumns processing included in an AES decryption process is replaced with a matrix transfoiiiiation that uses an inverse matrix of the 16×16 transform matrix.

* * * * *